United States Patent [19]
Ayres et al.

[11] Patent Number: 5,561,360
[45] Date of Patent: Oct. 1, 1996

[54] BATTERY CYCLE LIFE IMPROVEMENTS THROUGH BIFURCATED RECHARGE METHOD

[75] Inventors: John L. Ayres, Cicero; Richard M. Bendert, Pendleton; Dell A. Crouch, Jr., Noblesville, all of Ind.

[73] Assignee: General Motors Corporation, Detroit, Mich.

[21] Appl. No.: 236,052

[22] Filed: May 2, 1994

[51] Int. Cl.⁶ .................................................. H01M 10/44
[52] U.S. Cl. ................................................ 320/14; 320/23
[58] Field of Search ................................. 320/5, 20, 21, 320/22, 30, 4, 23, 43, 46, 48, 14

[56] References Cited

U.S. PATENT DOCUMENTS

| | | | |
|---|---|---|---|
| 4,385,269 | 5/1983 | Aspinwall et al. | 320/14 |
| 4,746,852 | 5/1988 | Martin | 320/20 |
| 4,829,225 | 5/1989 | Podrazhansky et al. | 320/14 |

*Primary Examiner*—Peter S. Wong
*Assistant Examiner*—Edward Tso
*Attorney, Agent, or Firm*—Vincent A. Cichosz

[57] ABSTRACT

A two part battery recharge method first introduces stepped charge current to the battery to restore a majority of energy to a deeply discharged battery. Thereafter, relatively low frequency periodic charge currents and discharge currents interspersed with relaxation periods are introduced to the battery to effectuate efficient energy restoral and increased cycle life of the battery.

8 Claims, 4 Drawing Sheets

BATTERY CYCLE LIFE IMPROVEMENTS THROUGH BIFURCATED RECHARGE METHOD

BACKGROUND OF THE INVENTION

This invention is directed toward a method for recharging electrochemical battery systems. More precisely, a method suitable for use in systems characterized by high depth discharge batteries used in systems requiring long life and experiencing frequent recharging.

In particular demand for such battery systems are traction application systems such as electric vehicles. Such systems are typified by deep discharges and, in order to meet typical customer requirements, will require a substantially long useful life experiencing frequent, rapid recharges. Conventional gas recombinant lead acid batteries have been improved upon structurally with the advent of "starved electrolyte" designs to forestall material shedding and sulfating at the bottom of the plates thereby extending life cycles to a certain degree. However, structural changes have limited ability to address other factors contributing to degradation of a battery's capacity over numerous cycles.

It is well recognized that the cycle life of gas recombinant lead-acid batteries is very dependant upon the charge voltage and particularly so as the battery approaches a full charge. However, conventional charging regimes contribute little to extending the life of gas recombinant batteries. In fact, gas recombinant lead-acid batteries recharged conventionally will experience degradation attributable to drying out, plate surface polarization and grid corrosion thereby lessening the capacity on each subsequent cycle. Additionally, mere conservative voltage and current control will yield extended charge times while too aggressive a voltage and current control will result in excess gas generation and accelerated capacity degradation.

SUMMARY OF THE INVENTION

Therefore, one object of the present invention is to charge a battery in such a manner as to extend its cycle life.

A further object is to accomplish a charge meeting the previous object in a relatively short time frame.

The present invention provides for a method of battery recharge for gas recombinant lead acid batteries that greatly increases cycle life. A first portion of recharge is provided by supplying the battery with a series of discrete charge currents. Each charge current is delivered to the battery for a duration determined by the physical limits of the battery to accept the charge. Upon the occurrence of an event indicating low charge acceptance by the battery, for example battery voltage reaching a predetermined voltage lid, charging at the present current level is ceased and charging at a step-wise reduced discrete charge current begins. This sequence is continued for a predetermined duration definable by time, current magnitude, cycles etc. After the first portion of recharge is complete, periodic charge currents, and discharge current interspersed with relaxation periods are introduced to the battery. The magnitude and durations of the periodic charge currents are chosen such that remote material sites are effectively converted to substantially the same degree as material sites exposed more directly to the battery electrolyte. The duration of the relaxation period is chosen such that the substantially immobilized electrolyte is allowed to homogenize thus bringing more water into contact with the more remote material sites yet to be converted. Finally, the duration and magnitude of the periodic discharge currents is chosen to minimally discharge the battery yet substantially remove surface charge such that application of the next periodic charge current is accepted by the battery for substantial material conversion with minimal outgassing.

DETAILED DESCRIPTION OF THE DRAWINGS

Figure 1:
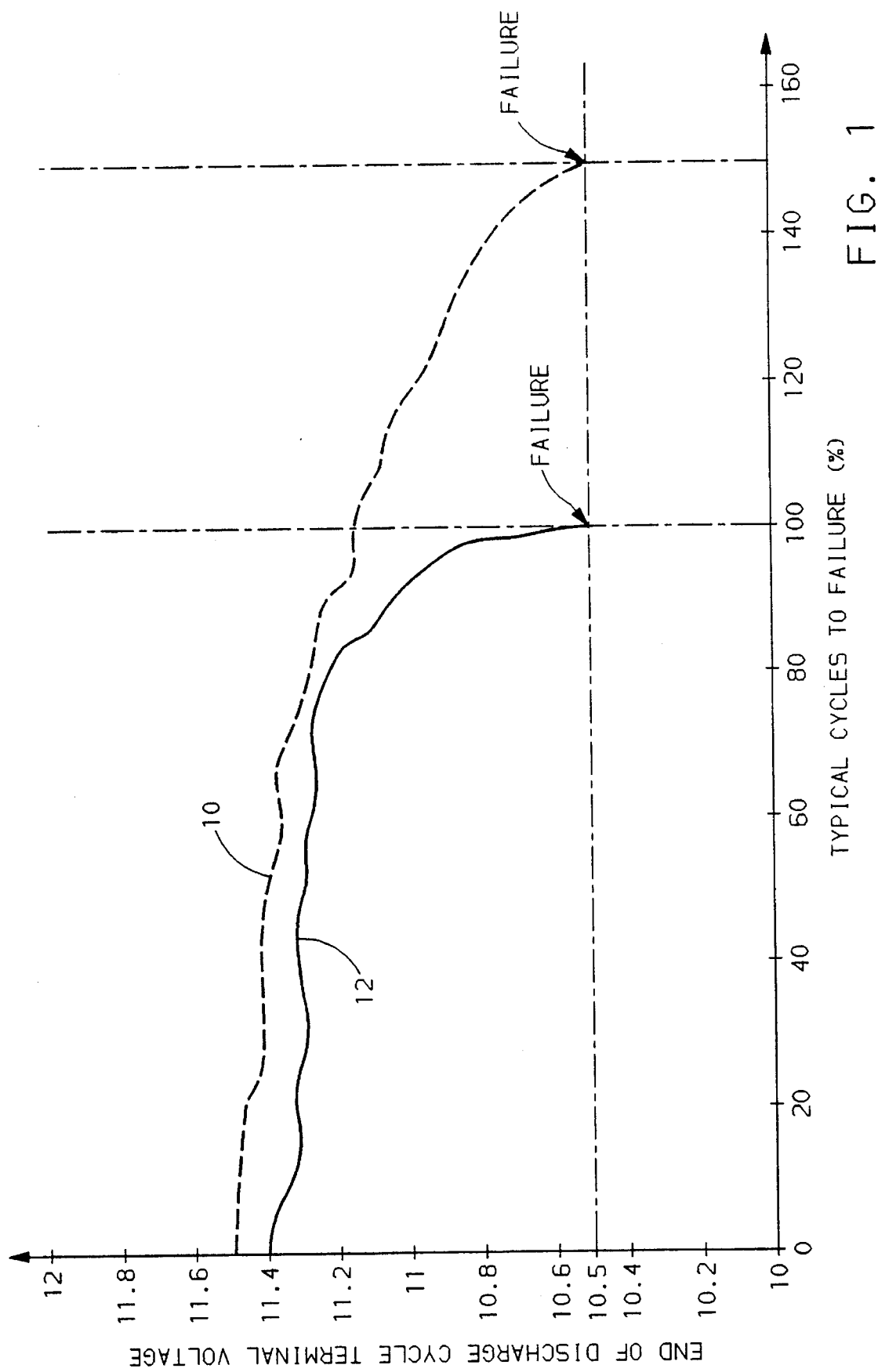
FIG. 1 illustrates typical battery cycle life improvements attributable to the recharge method of the present invention.

Referring first to FIG. 1, a graphical representation of the life cycle extension to deep discharge batteries possible by implementation of the present inventive method is illustrated. The data used to generate the present graph of FIG. 1 was derived from twelve (12) volt starved electrolyte gas recombinant lead acid batteries which were subjected to repetitive 80% depth of discharge (from rated capacity) followed by recharge cycling. The vertical axis is scaled in volts and the plotted data represents the end of discharge terminal voltage of a battery. The useful life of a battery is determined by the end of discharge voltage being below a predetermined voltage for a given depth of discharge—in this case 80%. The horizontal axis is normalized to percent of typical cycles to failure. This is done to illustrate the proportional or percentage improvement of the present charge regime over the conventional charge regime to which the horizontal axis is normalized.

The first plotted line 12 was obtained from empirical data of a battery of the type previously described which underwent a conventional constant voltage/tapered current recharge regime. The second plotted line 10 was obtained from empirical data of a substantially identical battery which underwent a recharge regime of the type described herein. The discharge regimes utilized in data generation for both plots were identical 80% depth of discharge at a constant current of substantially 25 amps which is approximately one-half the amp*hour rating of the battery utilized.

Each plotted line 10,12 represents a concatenation of sequential end of discharge terminal voltages and a curve fit therethrough. Generally, as the batteries repetitively underwent a 80% depth of discharge followed by a recharge in accordance with either a traditional recharge regime (line 12) or a recharge regime consistent with the present invention (line 10), the terminal voltage at the end of discharge decayed from one cycle to the next. An end of discharge voltage of 10.5 volts was arbitrarily chosen to represent the terminal voltage at which the battery's useful life was over. The traditionally charged battery data was used as a baseline for normalizing the plot of the two sets of data thereto. From these plots then it can be seen that the battery recharged in accordance with the present invention yielded significantly more cycle life (approximately 50%) over that obtainable with conventional recharge regimes. The life of a battery recharge in accordance with the present invention is substantially 150% that of a conventionally recharged battery.

Figure 2:
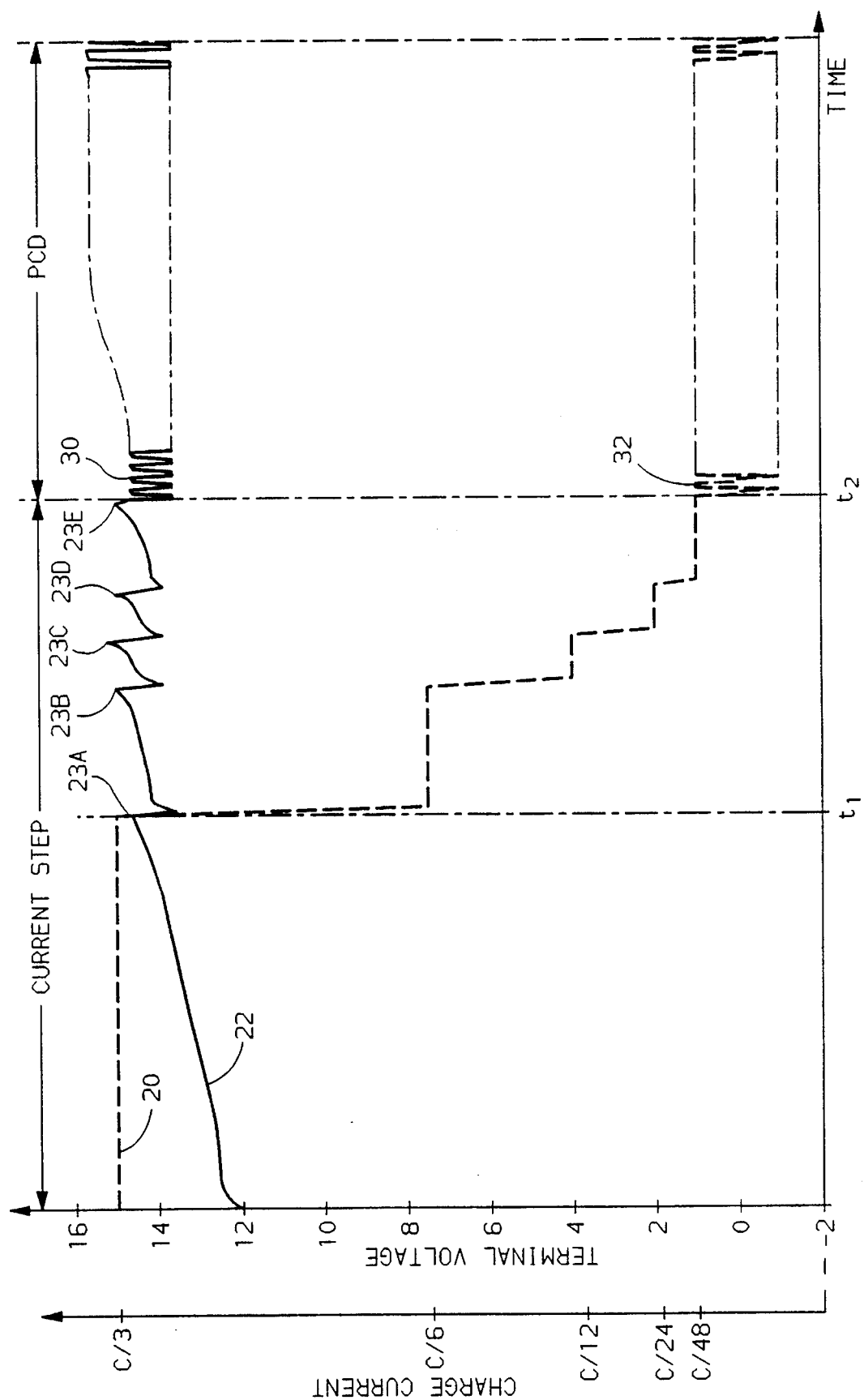
FIG. 2 illustrates graphically battery voltage and current parameters during an exemplary bifurcated recharge in accordance with the present invention.

FIG. 2 shows a plot of battery charge current 20 and resultant battery terminal voltage 22 (scaled at opposite vertical axes) against a common horizontal time axis resulting from a battery recharge performed in accordance with a preferred implementation of the present invention. A conventional starved electrolyte gas recombinant 12 volt lead acid battery was used to generate the data resulting in the plots of FIG. 2. The designation "C", as commonly used in the rating of batteries and as used herein, is the amp*hour rating of the battery at its one hour discharge rate. Dual left hand vertical axes are illustrated, one being labeled in absolute Volts at least through a range of voltage of concern in the recharge of a non-reversed battery of the variety previously mentioned and the other one being labeled in fractions of the battery's amp*hour rating "C". In obtaining the data for FIG. 2, the absolute value for "C" is substantially 45 amps so the initial charge current "C/3" is substantially 15 amps.

Upon initiation of a recharge cycle performed in accordance with the present invention, an initial charge current C/3 is supplied to the battery. For some time, consistent with expected battery characteristics, fairly efficient material conversion occurs at the battery plates and most of the energy input into the battery goes toward battery energy restoration as exemplified in the FIG. 2 through time t1. Battery terminal voltage rises in a controlled and relatively gradual rate at the initial current C/3 until time t1 when the battery's charge acceptance begins to diminish rather rapidly, its internal resistance rises and the terminal voltage begins to rise as evidenced by the voltage curve. It is well known that the rise in terminal voltage is a reliable indicator of the substantial increase in undesirable gas evolution. It is therefore desirable upon reaching such a rise in terminal voltage to minimize the gas evolution which has begun. The method of the present invention does this by reducing the charge current in stepwise fashion throughout the portion of the recharge regime labeled in the figure "Current Step". Preferably, each subsequent current step alleviates the gas evolution catalyzed by the previous step current to a substantial degree while still restoring energy to the battery at a substantial rate. By stepping down the current the battery voltage relaxes to a level where outgassing is reduced and material conversion is increased over the previous current. With a conventional tapered charge, the battery voltage would remain substantially fixed and never experiences the reductions obtainable by step-wise current reductions.

In generating the data for the plot of FIG. 2, current stepping to a lower value was initiated when gas evolution as measured by a mass flow meter reached a predetermined level. While this procedure was found to be quite useful in minimizing outgassing in the laboratory environment, it is anticipated that practical applications would likely utilize detection of a predetermined terminal voltage magnitude "lid" to initiate the current stepping. Such a terminal voltage lid could simply be a constant value for all current steps or could be a dynamic "lid" determined empirically. For example, the experimentally obtained terminal voltage values corresponding to the predetermined undesirable rate of gas evolution at the various current steps could provide such a plurality of voltage lids, one for each current step. Such voltage lids labeled 23a–23e are illustrated in relation to the various current steps of FIG. 2. Hereafter, it is assumed that a current step is initiated upon terminal voltage reaching a predetermined voltage lid.

It is desirable that the voltage lid(s) be established to prevent entry into or prolonged operation within regions of terminal voltage indicative of undesirable battery gassing and inefficient recharge. As illustrated in FIG. 2, the actual terminal voltage magnitude at which outgassing quickly accelerates to unacceptable levels may be different one current step to the next. Therefore, with a static voltage lid certain amounts of battery gassing may be inevitable near the termination of certain current steps in order that other current steps are not prematurely terminated. Preferably then a static voltage lid is chosen such that the average gas evolution during all of the current steps is minimized.

At detection of the terminal voltage at the predetermined voltage lid, the current delivered to the battery is monotonically cut back in step-wise fashion substantially instantaneously. The first illustrated occurrence is shown in FIG. 2 at time t1 whereat the terminal voltage is observed to respond to the current step by assuming a value consistent with greater charge acceptance and recharge efficiency. The reduced charge current results in a lower terminal voltage since the current now more closely coincides with the battery's ability to accept the charge. In other words, the charge current applied almost entirely results in mass transfer and minimally contributes to competing reactions in the evolution of oxygen and hydrogen.

The present embodiment utilizes a step series of currents wherein the each progressive step current is substantially the same fraction (½) of the previous step current. The actual current step magnitudes vary slightly from the fractional reduction scheme for ease of programming the programmable charge utilized in implementing the method of the present invention. The actual current step magnitudes used to generate the illustrated data are 15A, 7.5A, 4.0A, 2.0A, 1.0A. This step reduction provided very acceptable recharge times without introducing undue complexity to the present method. Of course, other step reduction schemes are fully contemplated by the inventors including empirically determined reduction steps which may further improve charge acceptance rates. The step reductions in the presently illustrated embodiment continue substantially as shown such that upon the voltage lid being reached by the battery terminal voltage, the next current step in the progression is invoked for continuing the current step portion of the recharge. At time t2, a predetermined step current is terminated as before and signals the termination of the current step portion of the recharge regime. At the termination of the current step portion of the recharge, a great majority of the energy removed from the battery has been restored thereto, and the charge acceptance of the battery is low.

Immediately after termination of the current step portion of the recharge, the battery is subjected to a discharge of sufficient magnitude and time to depolarize the battery plates, which action increases the charge acceptance upon application of a subsequent charge current. This marks the beginning of the second portion of recharge, the "Pulse Charge/Discharge" or "PCD" in accordance with the invention. During this portion of recharge, a predetermined charge current pulse is repetitively supplied to the battery as a portion of a periodic PCD cycle. In the present exemplary embodiment, the charge current is equivalent in magnitude to the last charge current step. The current magnitude is substantially greater than any conventionally applied constant current charge which might be applied in practice to battery at such a relatively complete state of energy restoration. FIG. 2 illustrates with an expanded time scale exemplary PCD current waveform 32 and battery voltage response waveform 30 with phantom lines showing the boundaries thereof.

After a single charge pulse, the battery with its high terminal voltage has again reached a very inefficient operating region in terms of charge acceptance and must again be returned to a state of greater charge acceptance to advance the recharge in an efficient manner. The battery is therefore allowed a period of relaxation (i.e. battery terminal open circuit) wherein the acid introduced into the electrolyte from material converted at the battery plates is allowed to migrate away from the plates thereby resulting in a more uniform electrolyte and making available sufficient water components for further material conversion. The relaxation period also serve to allow any accumulated surface charges or concentration gradients to degrade at least to a certain degree.

Following the relaxation period, the battery is next subjected to a current discharge of predetermined magnitude and duration primarily to effectuate depolarization of the battery plates and increase charge acceptance. In this described embodiment, the discharge current is equivalent in magnitude to the charge pulse current. However, the duration of the discharge is substantially abbreviated with respect to that of the charge pulse. This is necessary at least for ensuring that a net charge restoration is achieved. The discharge in the described embodiment follows immediately the termination of the relaxation period.

The current magnitudes (if any) and durations for the three periods comprising the PCD (charge, relaxation & discharge) are determined empirically for optimization to the particular battery system and may appear substantially different from those in the exemplary embodiment when optimized for an alternative battery system. In the present embodiment, a full 63 second period of PCD comprises 30 seconds of charge, 30 seconds of relaxation and 3 seconds of discharge. The porosity of the plates in a conventional starved electrolyte lead acid battery accounts for the relative duration of the charge and relaxation periods. In order that substantial plate penetration is achieved in such a porous cell battery, pulse durations will tend to be on the order of magnitude as described herein. This ensures that the more remote interior surfaces of the electrodes experience material conversion as well as the more exposed surface portions thereof. Similarly, in order that the relaxation period results in successful homogenization of the electrolyte through migration of high concentration acid away from the plates, time constants associated therewith will determine the duration of the relaxation period. The durations associated with the present embodiment corresponds to battery plates substantially 0.050–0.090 in. thick. Differing plate thicknesses will, of course, require correspondingly different pulse durations. With the present battery system, lesser duration charge and rest periods would diminish the charge penetration throughout the plates thereby contributing mostly to surface recharge and ignoring the significant surface area within the porous plates, and would reduce the potential for material conversion due to high acid concentrations at unconverted material sites.

Figure 3:
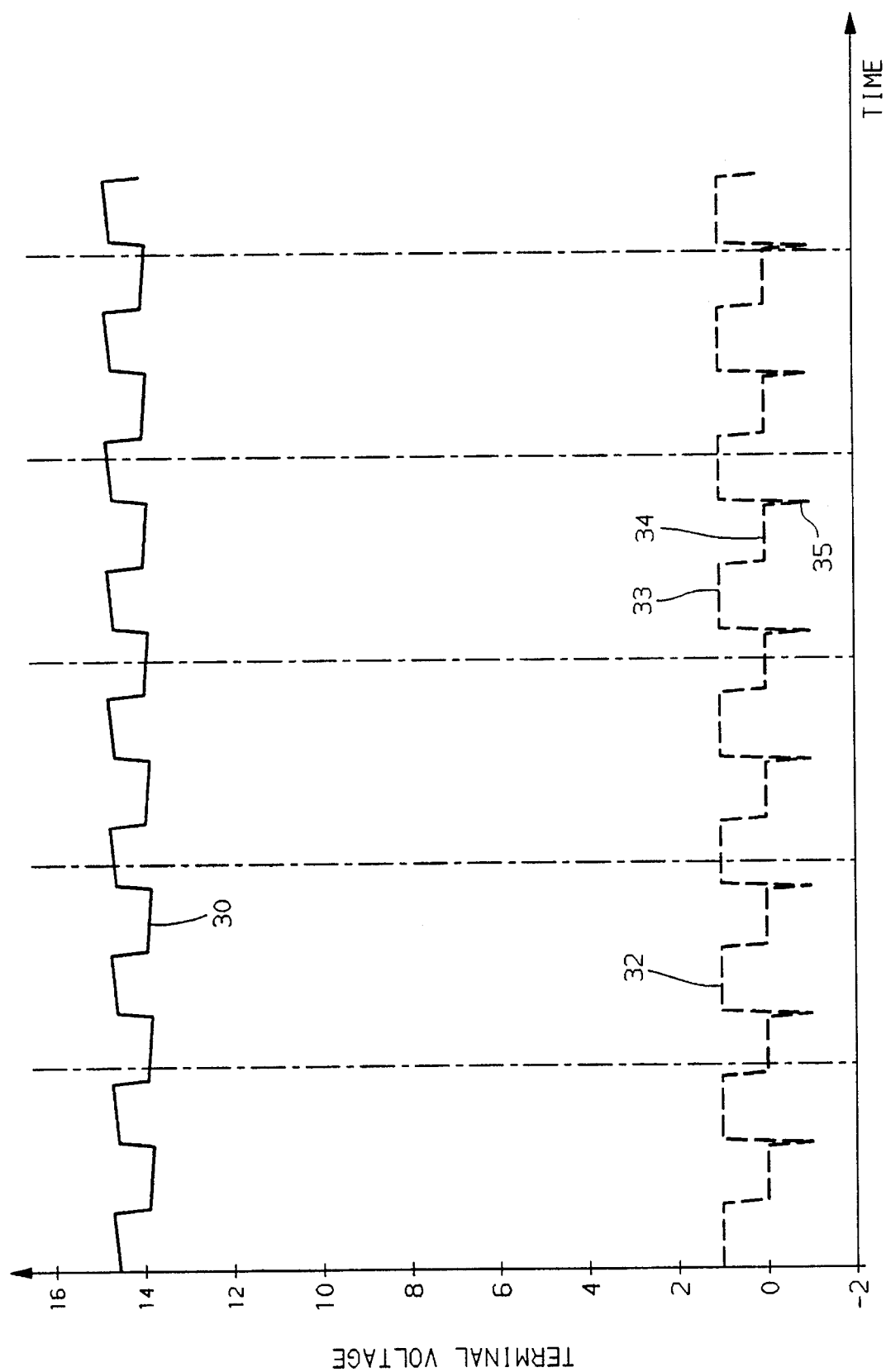
FIG. 3 illustrates the pulse charge-discharge portion of the exemplary bifurcated recharge in accordance with the present invention.

FIG. 3 illustrates a representative sample of the PCD current waveform 32 and battery voltage response waveform 30 as shown in FIG. 2 but with an expanded time scale for clarity. It can be seen that a pulse charge current 33 is followed by a relaxation period 34 and thereafter a current discharge 35 in a periodic fashion. Throughout the pulse charge/discharge portion of the recharge, it should be noted that the individual charge current pulses remain equivalent in magnitude as do the battery discharges. However, the battery terminal voltage can be seen in FIG. 2 trending upward.

The end of the second portion of the recharge is the end of the recharge of the battery system and may be flagged using different criteria. For example, in the preferred embodiment, the recharge is terminated when the total charge returned to the battery system is 110% of the charge removed during the previous discharge cycle. A certain amount of overcharge—10% in this case—allows for certain inefficiencies in the recharge process and ensures that the losses associated therewith are made up in order to fully restore a battery system to its full capacity. Integration of current over time can provide information related to charge restored and similar historical data of a monitored battery system can provide information related to charge removed. Alternatively, time duration of the second portion of the recharge as well as repetitions of pulse charges and discharges may be utilized to terminate the recharge. Another possibility proposed for charge termination is to allow a reduced magnitude "float" pulse charge to continue indefinitely until the battery is once again placed back into service. A preferred pulse voltage magnitude would correspond to the open circuit terminal voltage of the battery to prevent gassing during this indefinite period of float. This parallels with some common so called trickle charge schemes wherein a controlled current maintains a battery in a fully charged state until its service is required.

Figure 4:
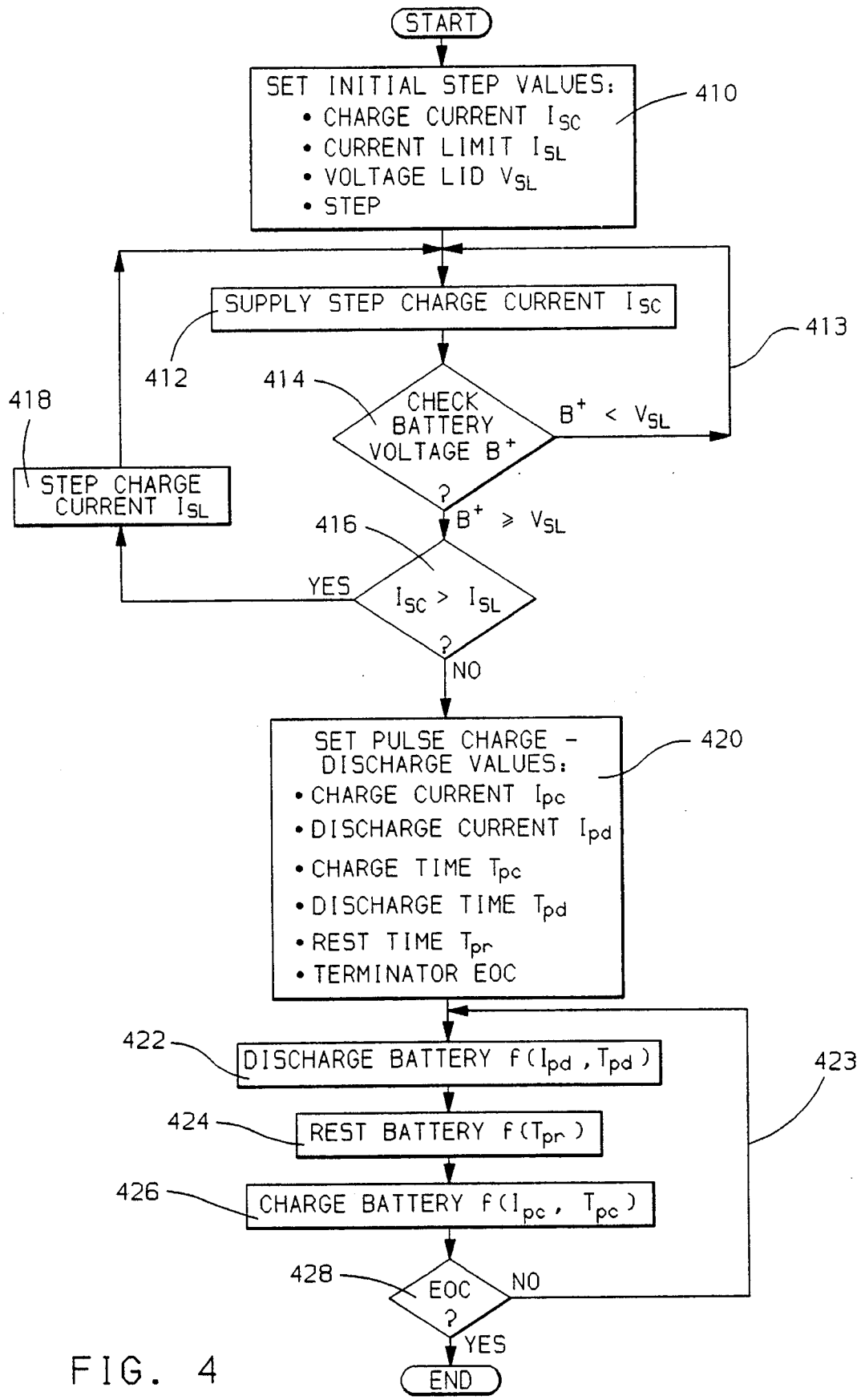
FIG. 4 is a logic flow diagram of the basic methodology of recharging a battery in accordance with an exemplary embodiment of the present invention.

Turning now to FIG. 4 which illustrates control steps for carrying out the present invention in accordance with the embodiment heretofore described, implementation of the steps are accomplished by use of a programmable computer controlled battery charger. Many such chargers are commercially available, among them being Bitrode LCN battery cycler available from Bitrode Corporation, Fenton, Mo., and IDK REJUVENATOR available from IDK Technologies Inc., New Orleans, La. Custom programmable chargers, commonly used in many industrial applications, may also be utilized to perform the recharge steps of the present invention. Varying degrees of operator interaction may also be required depending upon the degree of automation and programming flexibility afforded by the recharging hardware used, it being understood that the present invention is not limited by the hardware used or its level of sophistication to implement the recharge steps hereafter claimed.

It is assumed that the steps of FIG. 4 are performed by computer control from a predetermined set of program instructions and parameters. Block 410 represents initialization steps for the step current portion of the recharge which include establishing the initial values for charge current Isc, charge current lower limit Isl, voltage lid Vsl. The current step function STEP is also established at block 410 and provides information establishing the step pattern for the monotonically decreasing application of charge current. As described, the present embodiment uses a function which halves the current delivered to the battery at each successive step. Other schemes are fully contemplated by the inventors and include other geometric reductions, substantially exponential reductions and linear reductions among others. The initialization substeps in block 410 may be performed manually such as by inputting into a programmable charger via menu prompts and parameter selections or, as assumed herein, may simply be recalled out of memory storing a preset recharge regime. Assuming the latter implementation, the parameters are stored into a storage medium such as floppy disk, hard disk, Programmable Read Only Memory etc. for subsequent retrieval, modification and execution as required in accordance with the present invention.

Once parameters for the step portion of the recharge have been established or recalled, the step associated with block 412 is performed whereby a constant charge current Isc is supplied to the battery. Thereafter, a check of the battery terminal voltage versus the voltage lid Vsl is performed and for so long as the voltage lid Vsl is not met or exceeded, the present current Isc continues to be supplied as indicated by the loop established with line 413. Upon reaching or exceeding the voltage lid Vsl, decision block 416 is encountered and checks the present step current Isc magnitude against the lower current limit Isl for the step portion of the recharge. Where the present step current Isc remains above the lower current limit Isl, the step next performed is encompassed by block 418. At this point, step current Isc is reduced in accordance with the predetermined STEP function, which in the present embodiment effectuates a halving of the step current Isc. Thereupon the reduction, the new step current is caused to be delivered by the step illustrated in connection with block 412. The combination of steps represented by blocks 412–416 continue to cooperate together until at block 416 it is decided that the lower current limit Isl has been reached whereupon the step portion of the recharge is terminated and processing continues to block 420.

Block 420 represents steps substantively similar to those represented by block 410 for establishing parameters to carry out the recharge. These steps however are performed to parameters necessary to carry out the second portion of the recharge in accordance with the present invention. The parameter set-up steps may similarly be performed manually such as by inputting into a programmable charger via menu prompts and parameter selections or may be recalled out of memory storing a preset recharge regime. If the former case of manual implementation, these steps may be more expeditiously performed at the front end of the recharge along with the steps encompassed by block 410. The assumption in this case is that the parameters are recalled from memory and values therefor stored in memory location registers such as Random Access Memory for subsequent use and modification as required.

Block 420 steps establish the values for pulse charge current Ipc, discharge current Ipd, pulse charge duration Tpc, discharge duration Tpd and relaxation time Tpr therebetween a pulse charge and discharge. The charge termination function EOC (end of charge) is also established at block 420 and provides information establishing the charge termination.

In the present embodiment, pulse charge current Ipc is established as the last step current and the discharge current Ipd is also set in magnitude to the last step charge current. These values do not necessarily have to be of equivalent magnitude but in the present embodiment are so as a choice of convenience. Durations of the charge, relaxation and discharge periods are established in the present embodiment as 30 seconds, 30 seconds and 3 seconds respectively. The choice of durations will largely be a function of the particular battery(s) being recharged as previously indicated, the present durations having been established by empirically determining satisfactory recharges on a nominally rated 12 volt automotive gas recombinant lead-acid battery through charge and discharge durations ranging from approximately 0.003 seconds to approximately 30 seconds at charge and discharge currents of approximately C/50 and C/100.

The charge terminator in the present embodiment is chosen to be a capacity threshold related to the amount of charge withdrawn from the battery in the most recent prior discharge cycle preceding the recharge. Simple amp*hour integration techniques as well known to those skilled in the art may be used to determine the amount of charge removed and restored to the battery in real time. The charge removed will of course be historical data stored for example in a Random Access Memory location and the charge restored will be represented by the periodic time integration of current throughout both portions of the bifurcated recharge and similarly stored in a Random Access memory location for retrieval and updating as required.

Blocks 422–428 are next repetitively executed to implement a series of pulse charges, relaxation periods and discharges in accordance with the set-up parameters. Block 422 represents the step of discharging the battery at a discharge current magnitude of Ipd for a duration Tpd. Thereafter, the relaxation period is imposed by virtue of block 424 step execution. During any relaxation period, net battery current is substantially zero for a duration of Tpr. In the present embodiment, the duration is 30 seconds. Immediately adjacent the discharge associated with block 422 is the pulse charge established by block 426. The pulse charge current has a magnitude of Ipc and a duration of Tpc. Block 428 next represents steps for determining if the recharge is over. With the preferred termination criteria, it is decided that there is no end of charge until the charge restored exceeds the charge removed by a predetermined amount. In this case, when time integrated charge current is less than 110% of the charge removed from the battery blocks 422–428 are again executed as indicated by the loop established by line 423. The combination of steps represented by blocks 422–428 continue to cooperate together until at block 428 it is decided that the end of charge criteria has been met whereupon the pulse charge/discharge portion of the recharge is terminated. This also marks the end of the entire recharge.

While the invention has been described in terms of certain preferred parameters and associated values in relation the inventive method as applied to an exemplary type of lead acid battery, it is fully contemplated that practicing the invention on other battery systems may result in preferential parameters and associated values which differ from those disclosed herein but which are within the scope and spirit of the claims appended hereto.

The embodiments of the invention in which an exclusive property or privilege is claimed are defined as follows:

1. A method of extending the cycle life of deeply discharged gas recombinant lead acid electrolyte batteries by using a bifurcated recharge regime to improve charge acceptance of the battery, said method comprising:

a current step sequence of
   (a) providing a predetermined step charge current to the battery for a duration terminated by a predetermined step terminating event indicative of a significant reduction in charge acceptance at the predetermined step charge current;
   (b) upon detection of said step terminating event, repeating step (a) after reducing the predetermined step charge current;
   (c) repeating steps (a) and (b) a predetermined number of times and thereafter;

a pulse charge/discharge sequence of
   (d) providing a predetermined pulse charge current to the battery for a predetermined pulse charge time;
   (e) allowing the battery to relax for a predetermined relax time sufficient to homogenize the electrolyte;
   (f) discharging the battery at a predetermined discharge current for a predetermined discharge time sufficient to remove a surface charge from a plurality of battery plates; and,
   (g) repeating steps (d) through (f) for a duration terminated in accordance with a predetermined pulse charge/discharge sequence terminating event.

2. The method as claimed in claim 1 wherein said predetermined step terminating event comprises a terminal voltage of said battery exceeding a predetermined voltage lid.

3. The method as claimed in claim 1 wherein said predetermined step terminating event comprises the battery evolving gas in excess of a predetermined rate.

4. The method as claimed in claim 1 wherein an initial step charge current comprises a predetermined fraction of a nominal one-hour discharge rating of the battery.

5. The method as claimed in claim 1 wherein each step charge current subsequent an initial step charge current comprises a predetermined fraction of an immediately previous step charge current.

6. The method as claimed in claim 1 further comprising the steps in the pulse charge/discharge sequence of:

determining a charge removed from the battery prior to the recharge;

determining a charge restored to the battery during the recharge; and wherein said predetermined pulse charge/discharge terminating event comprises the determined charge restored exceeding the determined charge removed by a predetermined amount.

7. A method of extending the cycle life of deeply discharged gas recombinant lead acid electrolyte batteries by using a bifurcated recharge regime to improve charge acceptance of the battery, said method comprising:

providing a series of monotonically diminishing discrete charge currents to the battery, each discrete charge current being applied for a duration terminated by an event indicative of a substantial reduction in a portion of said discrete charge current contributing to material conversion at a battery electrode, and thereafter;

providing a series of alternating charge currents and discharge currents interposed with relaxation period, said charge currents being characterized by a duration empirically determined to convert material at a remote surface of a battery electrode, said relaxation period being characterized by a duration empirically determined to allow homogenization of the electrolyte, said discharge currents being characterized by a duration empirically determined to remove a surface charge and a charge gradient from a battery electrode.

8. A method of extending the cycle life of deeply discharged gas recombinant lead acid electrolyte batteries by using a bifurcated recharge regime to improve charge acceptance of the battery, said method comprising the steps:

providing a predetermined step charge current to the battery until a predetermined voltage lid is detected across the battery terminals;

repeating the previous step with monotonically diminishing charge currents for a predetermined number of times, and thereafter;

providing a predetermined series of periodic charge currents interspersed with one of (a) periodic discharge currents and (b) periodic rest.

* * * * *